(12) United States Patent
Jung et al.

(10) Patent No.: US 11,503,505 B2
(45) Date of Patent: Nov. 15, 2022

(54) CONDITIONAL MOBILITY WITH PARTIALLY COMPLIANT MOBILITY COMMAND

(71) Applicant: LG Electronics Inc., Seoul (KR)

(72) Inventors: Sunghoon Jung, Seoul (KR); Seungjune Yi, Seoul (KR); Sangwon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 167 days.

(21) Appl. No.: 16/992,429

(22) Filed: Aug. 13, 2020

(65) Prior Publication Data

US 2021/0051524 A1   Feb. 18, 2021

(30) Foreign Application Priority Data

Aug. 14, 2019 (KR) .......................... 10-2019-0099379

(51) Int. Cl.
  *H04W 28/18* (2009.01)
  *H04W 76/25* (2018.01)
  *H04W 76/18* (2018.01)

(52) U.S. Cl.
  CPC .......... *H04W 28/18* (2013.01); *H04W 76/18* (2018.02); *H04W 76/25* (2018.02)

(58) Field of Classification Search
  None
  See application file for complete search history.

(56) References Cited

FOREIGN PATENT DOCUMENTS

WO  WO-2020197480 A1 * 10/2020

OTHER PUBLICATIONS

Section 9.2.3 of 3GPP TS 38.300 V15.6.0 (Jun. 2019).
Section 5.3.5.8.2 of 3GPP TS 38.331 V15.6.0 (Jun. 2019).

* cited by examiner

*Primary Examiner* — Alex Skripnikov
(74) *Attorney, Agent, or Firm* — Dentons US LLP

(57) ABSTRACT

A method and apparatus for conditional mobility with partially compliant mobility command in a wireless communication system is provided. A wireless device evaluates a mobility execution condition from one or more mobility execution conditions only for cells for which corresponding target cell configuration from one or more target cell configurations can be complied.

13 Claims, 14 Drawing Sheets

CONDITIONAL MOBILITY WITH PARTIALLY COMPLIANT MOBILITY COMMAND

CROSS-REFERENCE TO RELATED APPLICATIONS

Pursuant to 35 U.S.C. § 119 (e), this application claims the benefit Korean Patent Application No. 10-2019-0099379, filed on Aug. 14, 2019, the contents of which are all hereby incorporated by reference herein in their entirety.

TECHNICAL FIELD

The present disclosure relates to conditional mobility with partially compliant mobility command.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

As part of 3GPP's Release 16, conditional handover (CHO) is a new solution that aims to improve the mobility robustness of a mobile terminal.

SUMMARY

For a conditional handover (CHO), more than one target cell can be prepared for the handover. In case of preparation of multiple target cell for CHO, a UE receives a CHO command including multiple target cell configurations corresponding to the prepared target cells. When the number of target cells in CHO command increases, the probability of configuration compliance error may also increase.

In an aspect, a method performed by a wireless device configured to operate in a wireless communication system is provided. The method includes evaluating a mobility execution condition from one or more mobility execution conditions only for cells for which corresponding target cell configuration from one or more target cell configurations can be complied.

In another aspect, an apparatus configured to operate in a wireless communication system for implementing the above method is provided.

DETAILED DESCRIPTION

Figure 1:
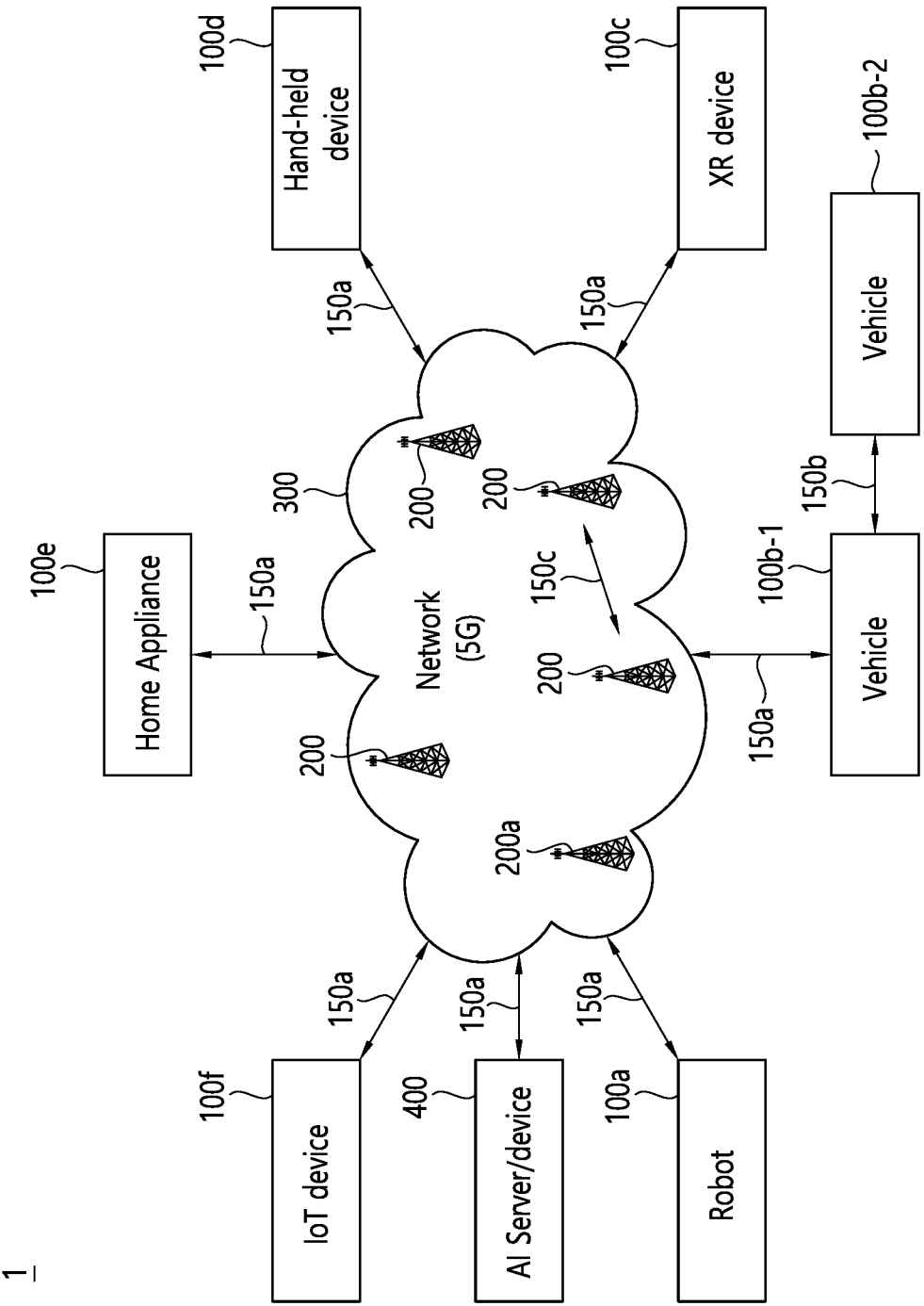
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world.

The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Figure 2:
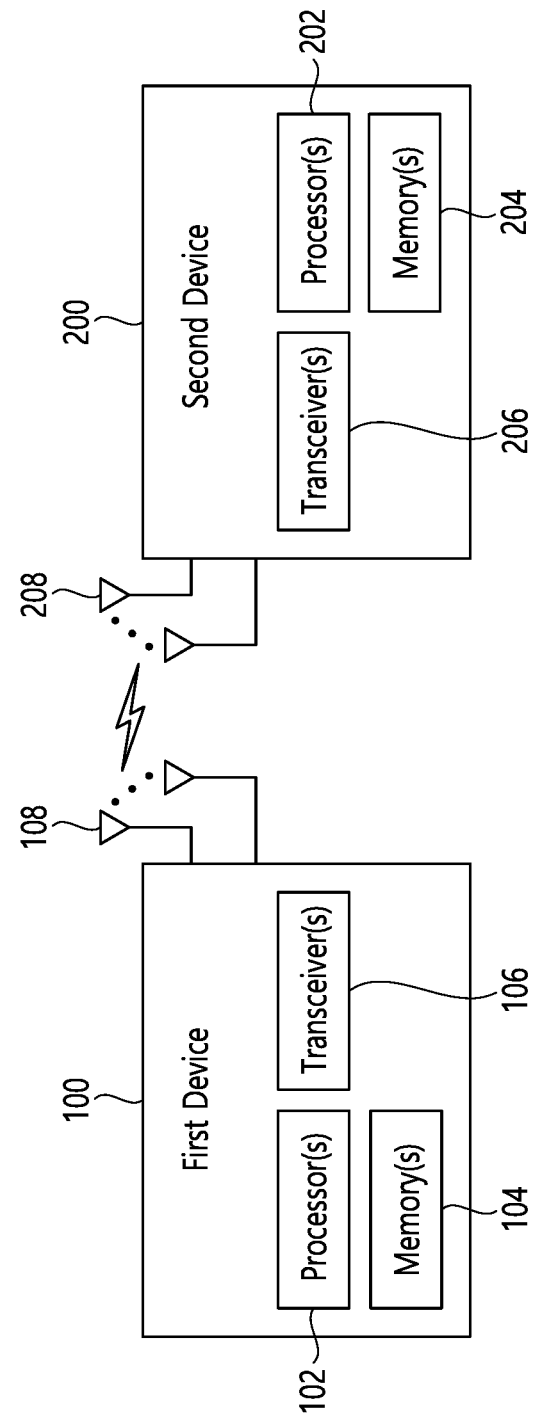
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
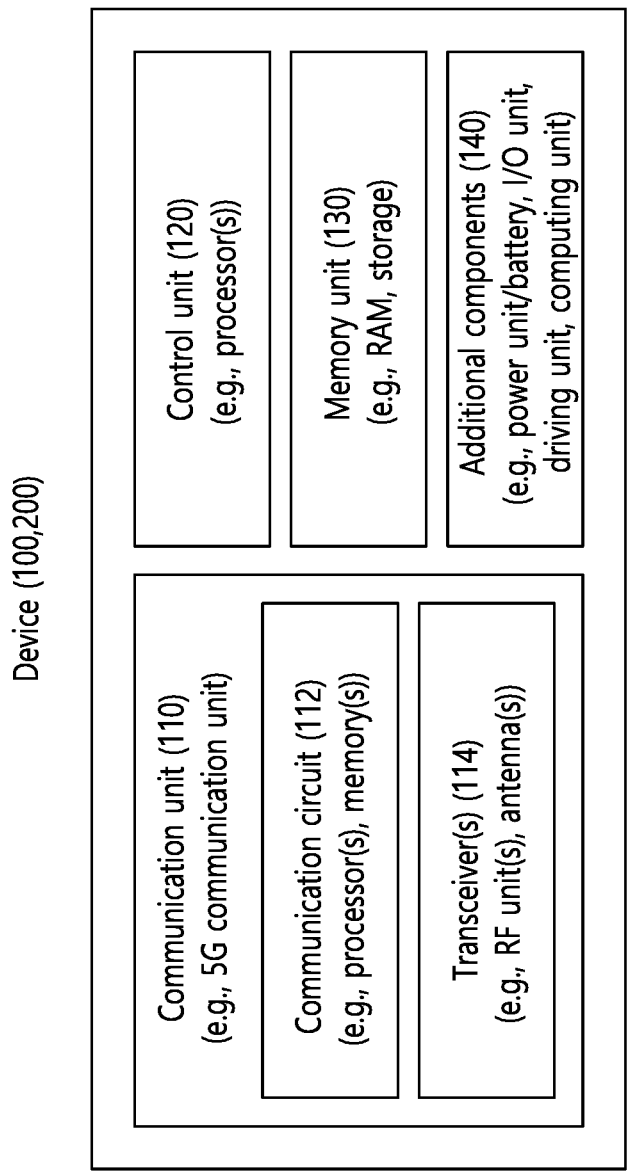
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
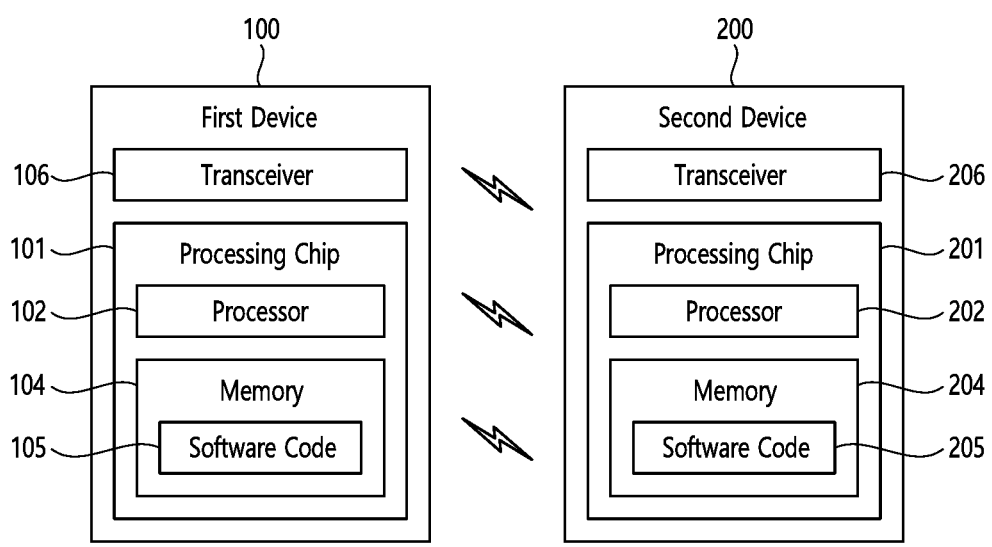
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
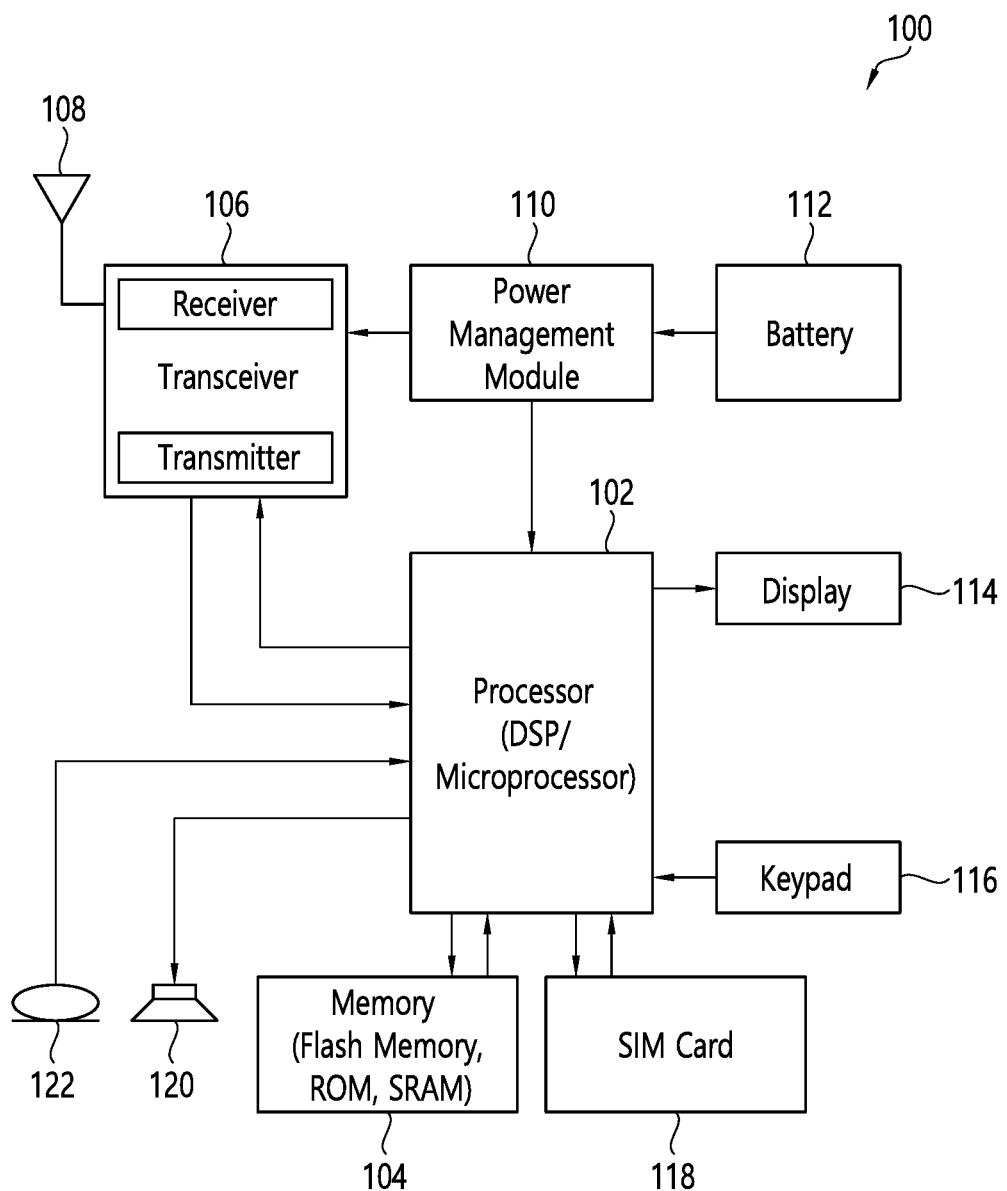
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
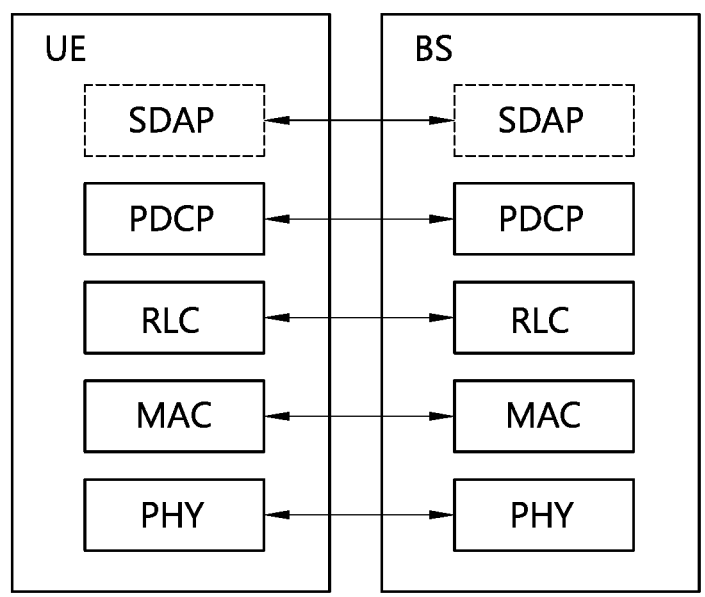
FIGS. 6 and 7 show an example of protocol stacks in a 3GPP based wireless communication system to which implementations of the present disclosure is applied.
Figure 7:
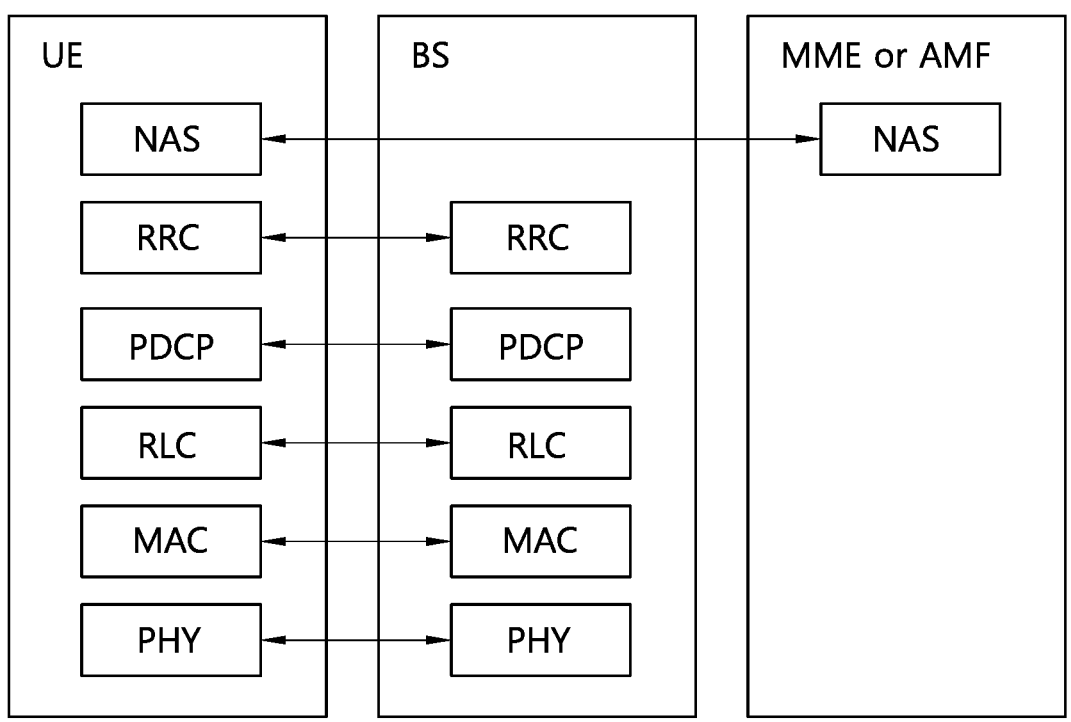

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3 GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data;

reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
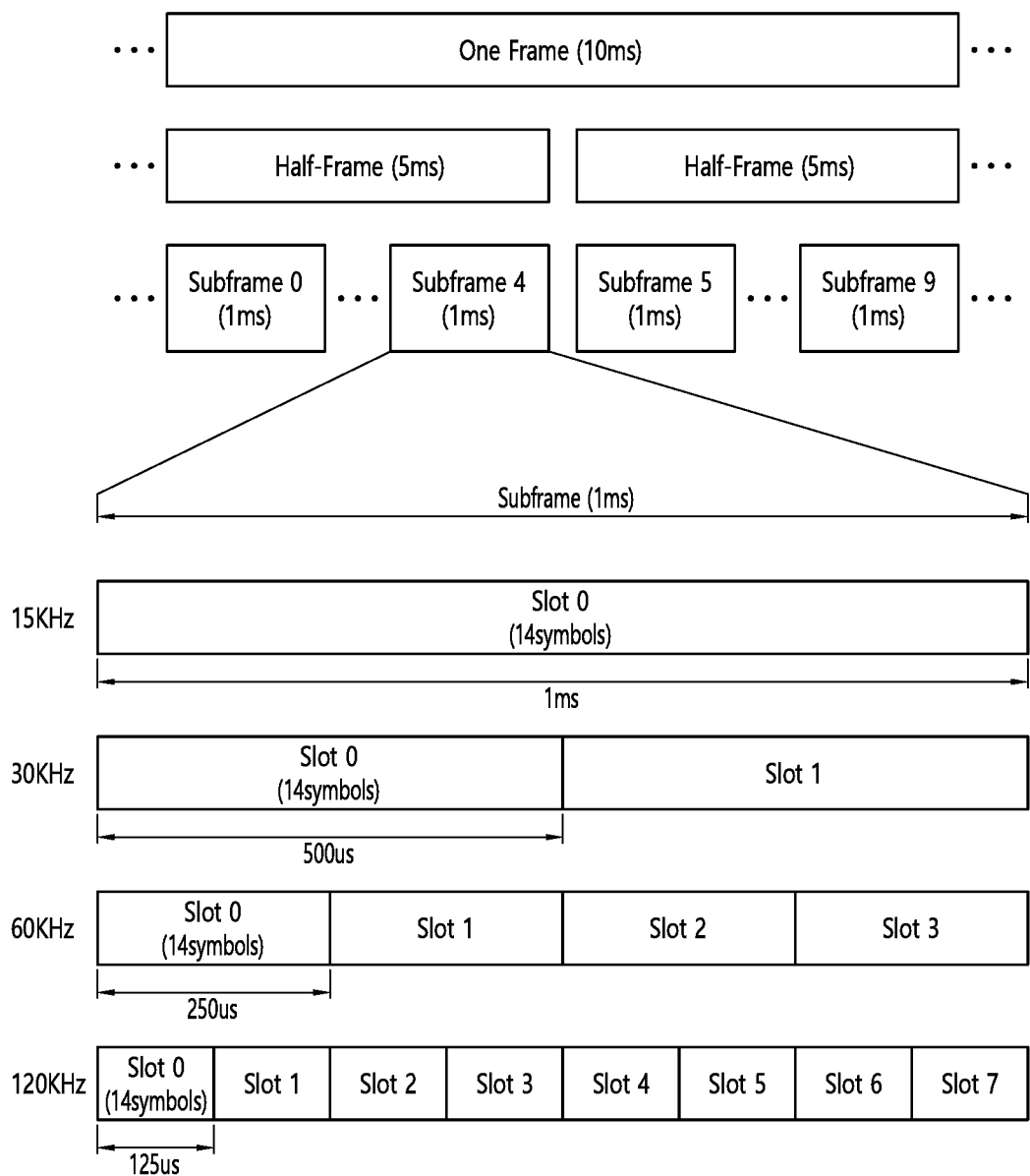
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
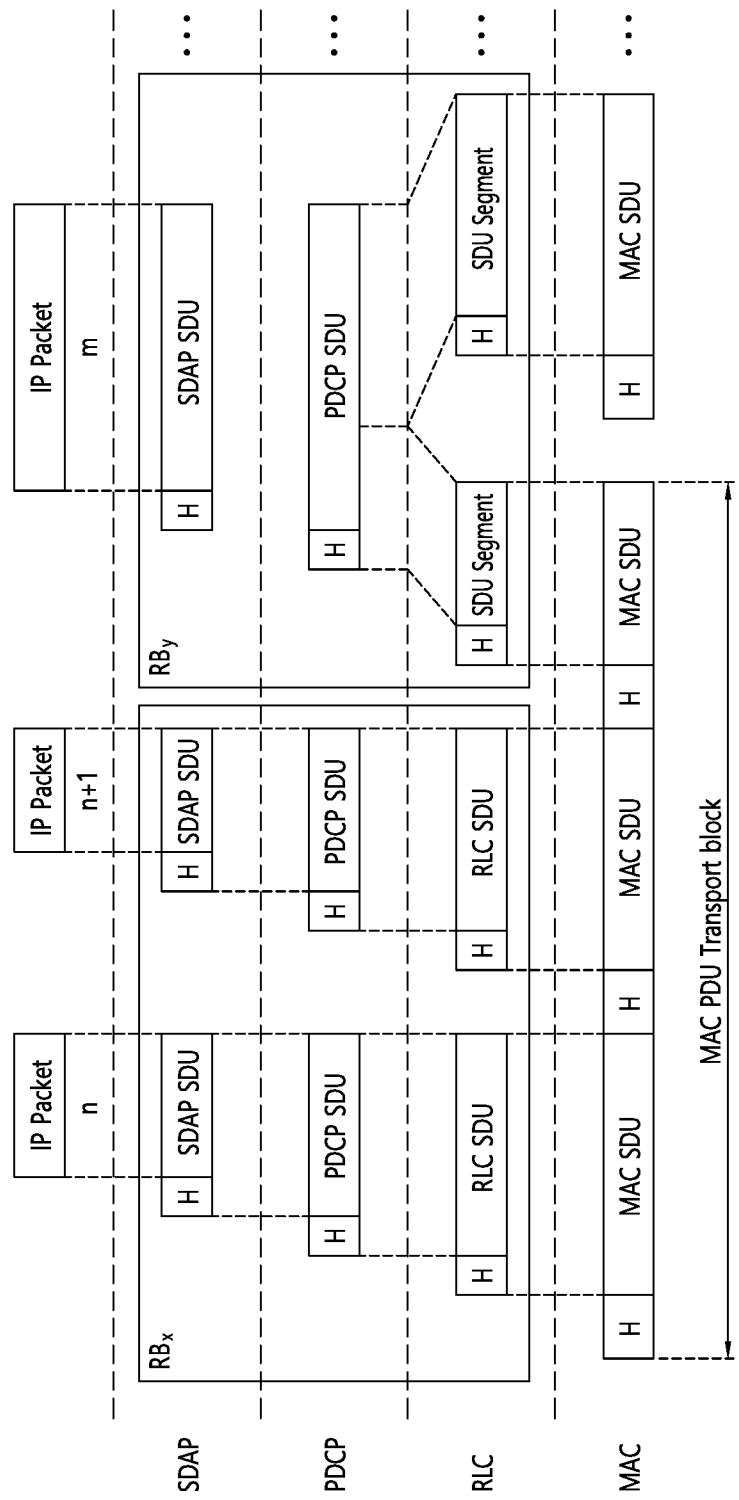
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels physical uplink shared channel (PUSCH) and physical random access channel (PRACH), respectively, and the downlink transport channels DL-SCH, BCH and PCH are mapped to physical downlink shared channel (PDSCH), physical broadcast channel (PBCH) and PDSCH, respectively. In the PHY layer, uplink control information (UCI) is mapped to physical uplink control channel (PUCCH), and downlink control information (DCI) is mapped to physical downlink control channel (PDCCH). A MAC PDU related to UL-SCH is transmitted by a UE via a PUSCH based on an UL grant, and a MAC PDU related to DL-SCH is transmitted by a BS via a PDSCH based on a DL assignment.

Mobility in RRC_CONNECTED is described. Section 9.2.3 of 3GPP TS 38.300 V15.6.0 (2019-06) can be referred.

Network controlled mobility applies to UEs in RRC_CONNECTED and is categorized into two types of mobility: cell level mobility and beam level mobility.

Cell level mobility requires explicit RRC signaling to be triggered, i.e., handover.

Figure 10:
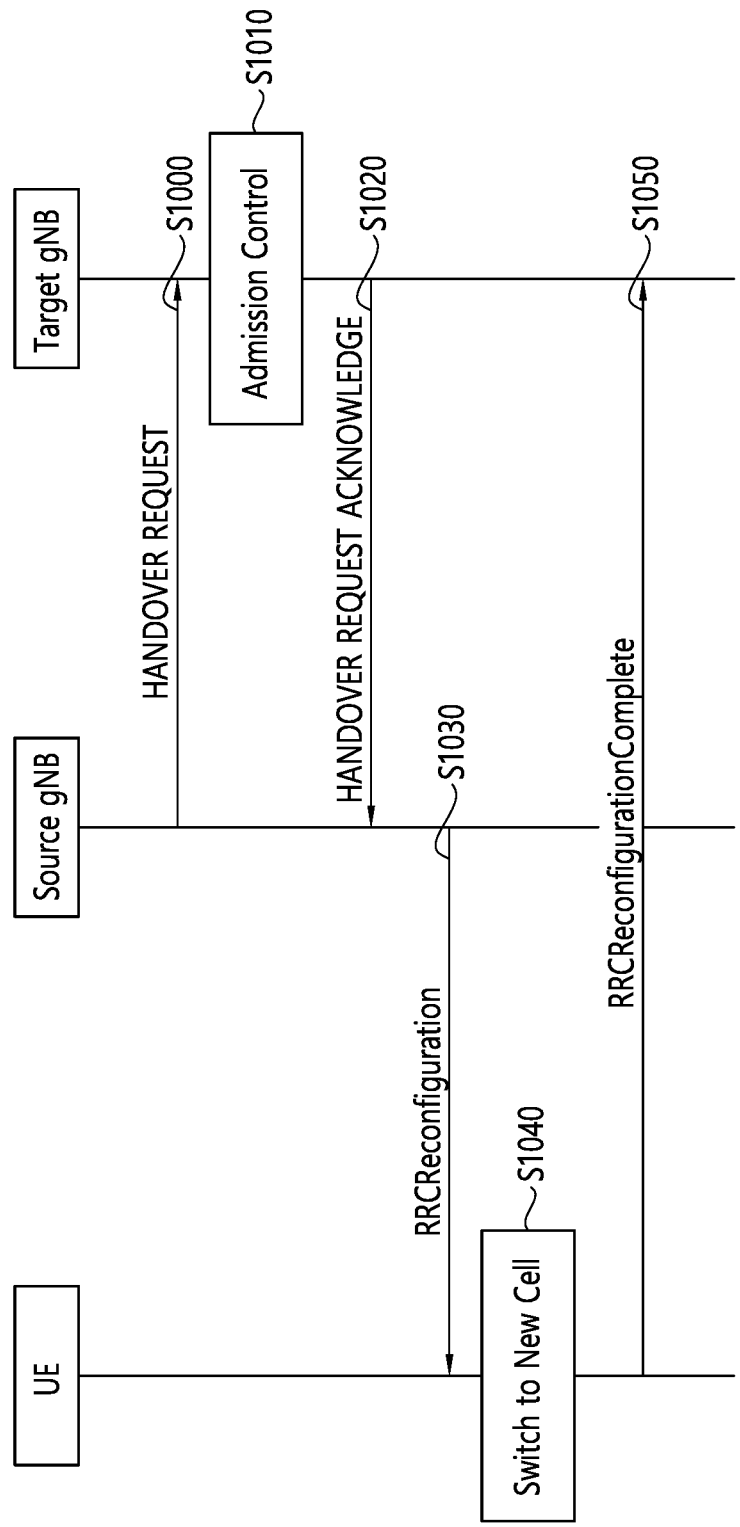
FIG. 10 shows an example of inter-gNB handover procedures to which implementations of the present disclosure is applied.

FIG. 10 shows an example of inter-gNB handover procedures to which implementations of the present disclosure is applied.

For inter-gNB handover, the signaling procedures consist of at least the following elemental components shown in FIG. 10.

In step S1000, the source gNB initiates handover and issues a Handover Request over the Xn interface.

In step S1010, the target gNB performs admission control. In step S1020, the target gNB provides the RRC configuration as part of the Handover Request Acknowledgement.

In step S1030, the source gNB provides the RRC configuration to the UE by forwarding the RRCReconfiguration message received in the Handover Request Acknowledgement. The RRCReconfiguration message includes at least cell ID and all information required to access the target cell so that the UE can access the target cell without reading system information. For some cases, the information required for contention-based and contention-free random access can be included in the RRCReconfiguration message. The access information to the target cell may include beam specific information, if any.

In step S1040, the UE moves the RRC connection to the target gNB. In step S1050, the UE replies with the RRCReconfigurationComplete.

User data can also be sent in step S1650 if the grant allows.

The handover mechanism triggered by RRC requires the UE at least to reset the MAC entity and re-establish RLC. RRC managed handovers with and without PDCP entity re-establishment are both supported. For DRBs using RLC AM mode, PDCP can either be re-established together with a security key change or initiate a data recovery procedure without a key change. For DRBs using RLC UM mode and for SRBs, PDCP can either be re-established together with a security key change or remain as it is without a key change.

Data forwarding, in-sequence delivery and duplication avoidance at handover can be guaranteed when the target gNB uses the same DRB configuration as the source gNB.

Timer based handover failure procedure is supported in NR. RRC connection re-establishment procedure is used for recovering from handover failure.

Beam level mobility does not require explicit RRC signaling to be triggered. The gNB provides via RRC signaling the UE with measurement configuration containing configurations of synchronization signal block (SSB)/channel state information (CSI) resources and resource sets, reports and trigger states for triggering channel and interference measurements and reports. Beam level mobility is then dealt with at lower layers by means of physical layer and MAC layer control signaling, and RRC is not required to know which beam is being used at a given point in time.

SSB-based beam level mobility is based on the SSB associated to the initial DL BWP and can only be configured for the initial DL BWPs and for DL BWPs containing the SSB associated to the initial DL BWP. For other DL BWPs, beam level mobility can only be performed based on CSI-RS.

Conditional handover (CHO) is described.

It is expected that channel conditions in NR changes rapidly considering especially beamforming system in high frequencies. This would put obstacles in UE performing RRC level handover procedures. Compared to LTE handover performance, severe handover performance degradation is also observed. Therefore, it is necessary to overcome the shortcoming of the existing handover procedure in high frequency environment.

As a way to resolve the above difficulties in NR radio condition, it is suggested to consider handover procedure based on a configured condition (i.e., conditional handover (CHO)). The motivation for the handover procedure based on a configured condition is to reduce the time to taken for transmission of measurement reporting and reception of handover command and handover preparation so that it would be possible to reduce the handover failure caused by not receiving handover command at a proper time.

Figure 11:
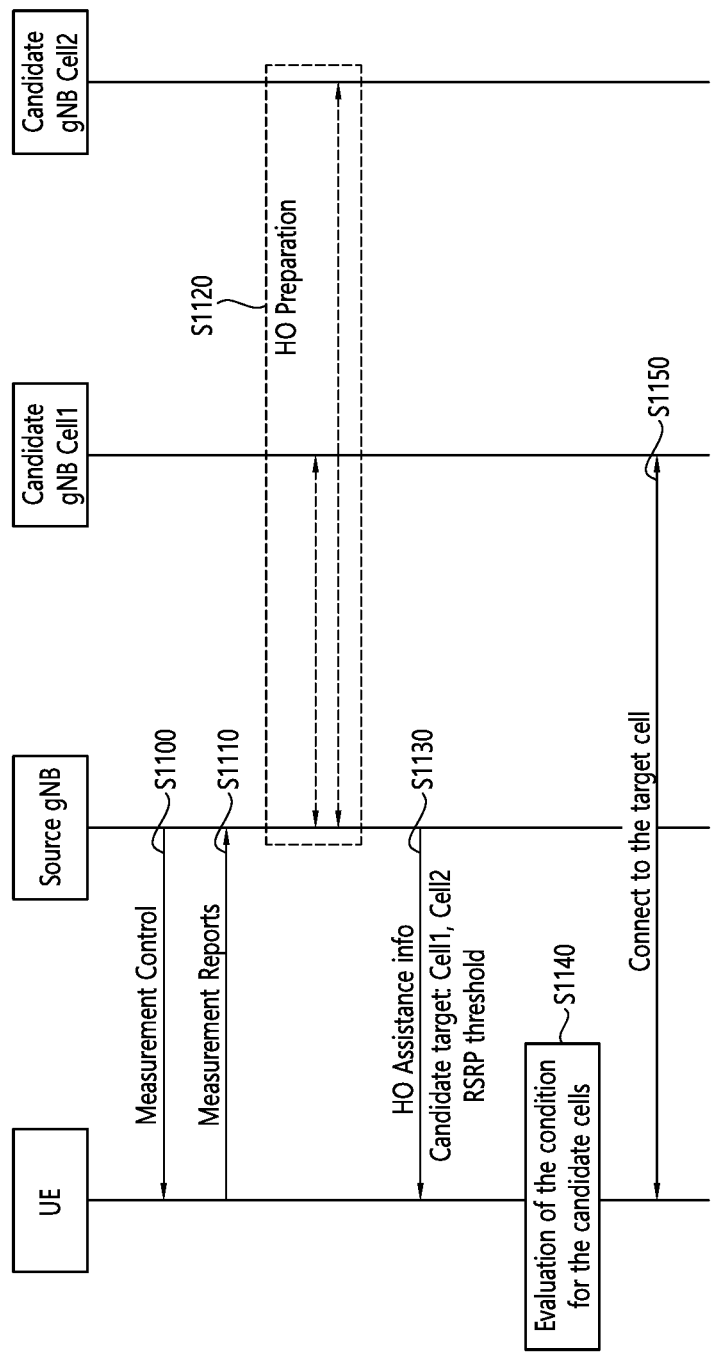
FIG. 11 shows an example of overall procedure for condition based autonomous handover procedure to which implementations of the present disclosure is applied.

FIG. 11 shows an example of overall procedure for condition based autonomous handover procedure to which implementations of the present disclosure is applied.

In step S1100, the source gNB may provide measurement control information to the UE. In step S1110, the UE may transmit measurements reports based on the measurement control information.

In step S1120, the source gNB may prepare condition based autonomous handover procedure with candidate cells (e.g., Cell1 and Cell2 in FIG. 11). In step S1130, the source gNB provides handover assistance information to the UE.

The UE is provided with handover assistance information which includes a set of candidate cells and conditions (e.g., reference signal received power (RSRP)) for handover. It may be possible the network prepares the candidate cells and provide the handover assistance information without the measurement report from the UE if the network is able to know the trajectory or location of the UE based on, e.g., location reporting. Additionally, the network may determine the set of candidate cells based on the received measurement report.

There may be a concern on signaling overhead due to earlier triggering threshold. Measurement reporting may be reduced if an approach similar to blacklisted cells is introduced. In other words, if the UE reports on one cell, the network may prepare the multiple cells which is in proximity of the reported cell and provide the list of cells which are prepared. Then, the UE may not report on the cells even if the condition for measurement reporting is triggered.

The handover assistance information may be cell quality based conditions and the configuration which may be used in a target cell. The handover assistance information may include configuration for one or more candidate cells.

In step S1140, if the UE receives the handover assistance information, the UE initiates to evaluate the conditions for the candidate cell list to determine whether to perform handover procedure to one of the candidate cells.

In step S1150, if the condition is met, the UE performs connecting to the prepared target cell.

For this procedure, since the source gNB may not know the exact timing of UE detaching from the source gNB, there may be some unnecessary downlink transmissions from the network to the UE. To address this issue, the target gNB may indicate to source gNB that the UE has completed handover successfully so that the source gNB does not transmit to the UE anymore. In addition, if the source gNB does not receive the response for the transmitted data, the source gNB may not transmit the data in downlink considering the handover situation.

As s reserving the resource in one or more candidate cell is burdensome to the network, it may be possible for the network to manage the configuration efficiently. For instance, based on the timer associated with validity of the handover assistance information, the network and UE may discard the configuration associated with the conditional handover. In addition, based on measurement report from the UE, network may configure, modify and/or discard the configuration.

Furthermore, if the UE successfully connects to the target cell, the target cell may inform to the source cell to discard the reserved configuration of the other candidate cell.

In summary, CHO is being introduced to avoid a handover failure that may happen due to, e.g., reception of handover failure. In CHO, a UE receives a CHO command prior to actual handover timing so as to increase the probability of successful handover. The CHO command includes information indicating CHO execution condition(s) and target cell configuration(s) each corresponding to different target cell (s). After receiving CHO command, the UE evaluates CHO execution condition. If at least one target cell satisfies the CHO execution condition, the UE initiates access to the target cell using the target cell configuration for the target cell.

For CHO, more than one target cell may be prepared for the handover. In case of preparation of multiple target cells for CHO, a UE receives a CHO command including multiple target cell configurations corresponding to the prepared multiple target cells. Since handover preparation is performed quite in advance to actual handover, there may be some ambiguity regarding which target cell among multiple candidate target cells will be finally chosen as the CHO target cell. Given such ambiguity, it is highly desirable if multiple candidate target cells are prepared for CHO to increase CHO success rate. When the number of candidate target cells in the CHO command increases, the probability of configuration compliance error also increases.

It is also possible that the target configuration of the candidate target cell was valid at the moment when the candidate target cell was prepared but becomes finally invalid at the moment of CHO execution due to the change of the source cell configuration, in case the target cell configuration was generated and provided to the UE as a delta configuration with the assumption that the old source configuration is a baseline configuration.

Referring to Section 5.3.5.8.2 of 3GPP TS 38.331 V15.6.0 (June 2019), if the UE cannot comply with any part of received RRC configuration, it should declare a compliance failure and initiates RRC connection re-establishment (i.e., connection recovery procedure).

To avoid a mobility failure, the UE should avoid a CHO towards a cell for which the corresponding target cell configuration cannot be compliant. At the same time, the UE should not simply declare a failure and initiate connection re-establishment procedure even if a part of the multiple target cell configurations received in the CHO command is not compliant, as long as there is at least one remaining target cell configuration that can be compliant by the UE.

Furthermore, to avoid a mobility failure caused by a mobility towards a cell for which the corresponding target cell configuration cannot be incompliant, a method to update the incompliant target cell configuration by a new configuration that can be compliant by the UE and/or a method to release the incompliant target cell configuration may be needed.

According to some implementations of the present disclosure, if a UE receives a mobility command (e.g., a CHO command) including one or more mobility execution conditions and one or more target cell configurations and if the UE detects that a part of the one or more target cell configuration cannot be compliant, the UE excludes a target cell for which the corresponding target cell configuration cannot be compliant from the candidates of conditional mobility (e.g., CHO). That is, if there is at least one target cell configuration that cannot be compliant, the UE precludes the cell for which the corresponding target cell configuration cannot be compliant from the candidates of conditional mobility for evaluation of mobility execution conditions (e.g., CHO execution condition). On the other hand, if any of the one or more target cell configurations included in the mobility command cannot be compliant, the UE may be required to declare a failure of applying the mobility command and initiate a connection recovery procedure, e.g., RRC connection re-establishment procedure.

According to some implementations of the present disclosure, the UE may indicate to its source cell that the UE has a target cell configuration that cannot be compliant. The indication may indicate the candidate target cell for which the corresponding candidate target cell configuration cannot be compliant. Upon receiving the indication, the source cell may take a proper action towards the candidate target cell indicated by the indication. The action may include a request to update the candidate target cell configuration and/or a request to cancel the handover. If the source cell receives a new/updated target cell configuration from the candidate target cell, the source cell may send the received new/updated candidate target cell configuration to the UE.

According to some implementations of the present disclosure, the UE may indicate to its target cell, after the UE completes CHO to the target cell, that the UE (previously) has a candidate target cell configuration that cannot be compliant. The indication may indicate the candidate target cell for which the corresponding candidate target cell configuration cannot be compliant. Upon receiving the indication, the target cell (i.e., now a new serving cell) may take a proper action towards the candidate target cell indicated by the indication. The action may include informing the candidate target cell of the compliance error with possibly the cause of the compliance error, so that the candidate target cell takes the information into account for preparation of CHOs for another handover events.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 12:
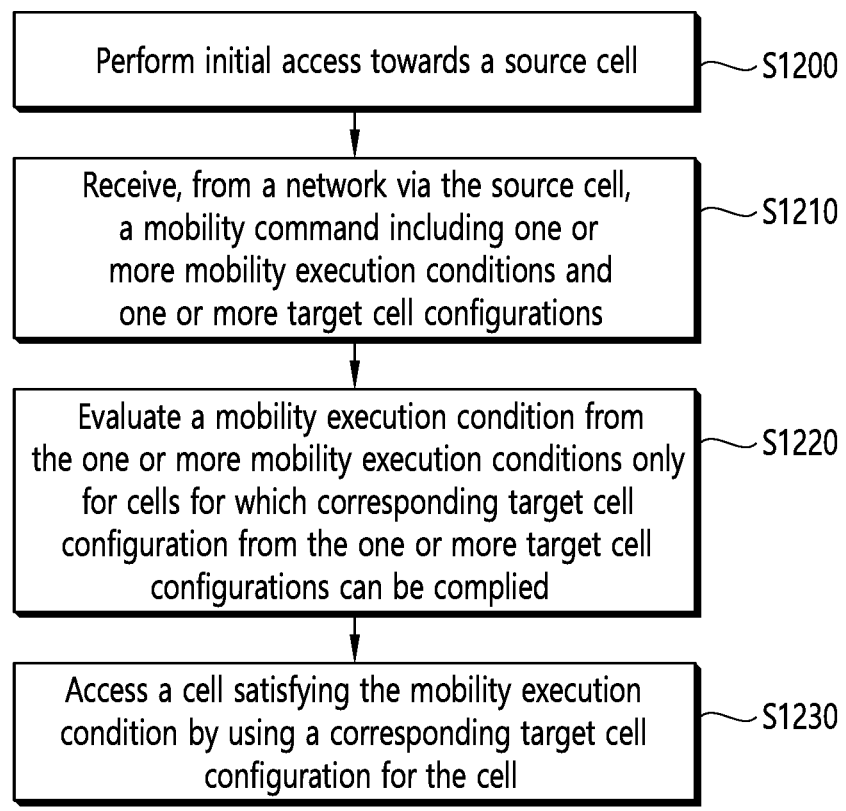
FIG. 12 shows an example of a method performed by a wireless device configured to operate in a wireless communication system to which implementations of the present disclosure is applied.

FIG. 12 shows an example of a method performed by a wireless device configured to operate in a wireless communication system to which implementations of the present disclosure is applied.

In step S1200, the wireless device performs initial access towards a source cell. Specifically, the wireless device may establish a connection with network (e.g. gNB). The wireless device may perform initial access towards the cell. The wireless device and the cell may perform random access channel (RACH) procedure. The wireless device may establish and/or resume a connection with the gNB and enter RRC_CONNECTED. The wireless device may perform AS security activation upon receiving security mode command from the gNB. The wireless device may configure radio bearers and radio configuration upon receiving RRC reconfiguration and/or resumes radio bearers and radio configuration upon receiving RRC resume. The cell becomes the source cell of mobility.

In step S1210, the wireless device receives, from a network node serving the source cell, a mobility command (e.g., CHO command) including one or more mobility execution conditions (e.g., CHO execution conditions) and one or more target cell configurations.

In some implementations, each of the one or more target cell configurations may be mapped to each of different target cells. In other words, the one or more target cell configurations may be configured for each of one or more target cells, respectively. In addition, the one or more mobility execution condition may be configured for each of the one or more target cells, respectively.

In some implementations, for the received one or more target cell configurations, the wireless device may evaluate/detect/determine if each of the one or more target cell configurations can be compliant or not. Upon detection of a target cell configuration that cannot be compliant, if there is at least one target cell configuration which can be compliant, the UE may not trigger connection recovery procedure, e.g., RRC connection re-establishment procedure. Upon detection of a target cell configuration that cannot be compliant, if there is no target cell for which corresponding target cell configuration can be compliant (i.e., all of the target cell configurations for any target cells cannot be compliant), the UE may initiate connection recovery procedure, e.g., RRC connection re-establishment procedure.

In some implementations, then, the wireless device may store the target cell configuration that can be complied. The wireless device may not store the target cell configuration that cannot be complied. In other words, the wireless device may determine that at least one target cell configuration from the one or more target cell configurations cannot be complied, and store the one or more target cell configurations except the at least one target cell configuration determined not to be complied.

In some implementations, if there is at least one target cell configuration that cannot be compliant, the wireless device may indicate to its source cell that the wireless device has at least one incompliant target cell configuration. The indication may include information (e.g., identifier (ID)) of each target cell for which the corresponding target cell configuration cannot be complied.

In some implementations, the wireless device may receive from its source cell a mobility command including a new target cell configuration for the target cell previously indicated to the source cell. In other words, the wireless device may receive from its source cell an updated configuration of the at least one target cell configuration which cannot be complied.

In some implementations, the wireless device may receive from its source cell a mobility command releasing the target cell configuration for the target cell previously indicated to the source cell. In other words, the wireless device may receive from its source cell an indication of releasing the at least one target cell configuration which cannot be complied.

In step S1220, the wireless device evaluates a mobility execution condition from the one or more mobility execution conditions only for cells for which corresponding target cell configuration from the one or more target cell configurations can be complied.

For example, for evaluation of the mobility execution condition, the wireless device may exclude, from the mobility candidates, the cell for which the target cell configuration cannot be compliant. For example, the wireless device may evaluate the mobility execution condition only for the cell for which the corresponding target cell configuration can be compliant and hence stored.

In step S1230, the wireless device accesses a cell satisfying the mobility execution condition by using a corresponding target cell configuration for the cell.

For example, if the mobility execution condition is met for at least one cell for which the corresponding target cell configuration can be compliant and hence stored, the wireless device may apply the target cell configuration and initiate access to the corresponding target cell.

In some implementations, if the target cell configurations for all target cells included in the mobility command cannot be compliant, the UE may initiate a connection recovery procedure, e.g., RRC connection re-establishment procedure.

In some implementations, the wireless device may be in communication with at least one of a mobile device, a network, and/or autonomous vehicles other than the wireless device.

Furthermore, the method in perspective of the wireless device described above in FIG. 12 may be performed by first wireless device 100 shown in FIG. 2, the wireless device 100 shown in FIG. 3, the first wireless device 100 shown in FIG. 4 and/or the UE 100 shown in FIG. 5.

More specifically, the wireless device comprises at least one transceiver, at least processor, and at least one computer memory operably connectable to the at least one processor and storing instructions that, based on being executed by the at least one processor, perform operations. The operations comprises performing initial access towards a source cell, receiving, from a network node serving the source cell, a mobility command including one or more mobility execution conditions and one or more target cell configurations, evaluating a mobility execution condition from the one or more mobility execution conditions only for cells for which corresponding target cell configuration from the one or more target cell configurations can be complied, and accessing a cell satisfying the mobility execution condition by using a corresponding target cell configuration for the cell.

In some implementations, the operations may further comprise determining that at least one target cell configuration from the one or more target cell configurations cannot be complied. In some implementations, the operations may further comprise storing the one or more target cell configurations except the at least one target cell configuration determined not to be complied.

In some implementations, the operations may further comprise transmitting, to the network node serving the source cell, information informing that the wireless device has the at least one target cell configuration which cannot be complied. For example, the information may further inform at least one target cell for which corresponding target cell configuration which cannot be complied.

In some implementations, the operations may further comprise receiving, from the network node serving the source cell, an updated configuration of the at least one target cell configuration which cannot be complied.

In some implementations, the operations may further comprise receiving, from the network node serving the source cell, an indication of releasing the at least one target cell configuration which cannot be complied.

In some implementations, the one or more target cell configurations may be configured for each of one or more target cells, respectively. In some implementations, the one or more mobility execution condition may be configured for each of the one or more target cells, respectively.

Furthermore, the method in perspective of the wireless device described above in FIG. 12 may be performed by control of the processor 102 included in the first wireless device 100 shown in FIG. 2, by control of the communication unit 110 and/or the control unit 120 included in the wireless device 100 shown in FIG. 3, by control of the processor 102 included in the first wireless device 100 shown in FIG. 4 and/or by control of the processor 102 included in the UE 100 shown in FIG. 5.

More specifically, an apparatus for configured to operate in a wireless communication system (e.g., wireless device) comprises at least processor, and at least one computer memory operably connectable to the at least one processor. The at least one processor is configured to perform operations comprising performing initial access towards a source cell, obtaining a mobility command including one or more mobility execution conditions and one or more target cell configurations, evaluating a mobility execution condition from the one or more mobility execution conditions only for cells for which corresponding target cell configuration from the one or more target cell configurations can be complied, and accessing a cell satisfying the mobility execution condition by using a corresponding target cell configuration for the cell.

In some implementations, the operations may further comprise determining that at least one target cell configuration from the one or more target cell configurations cannot be complied. In some implementations, the operations may further comprise storing the one or more target cell configurations except the at least one target cell configuration determined not to be complied.

In some implementations, the operations may further comprise controlling transmission of information informing that the wireless device has the at least one target cell configuration which cannot be complied. For example, the information may further inform at least one target cell for which corresponding target cell configuration which cannot be complied.

In some implementations, the operations may further comprise obtaining an updated configuration of the at least one target cell configuration which cannot be complied.

In some implementations, the operations may further comprise obtaining an indication of releasing the at least one target cell configuration which cannot be complied.

In some implementations, the one or more target cell configurations may be configured for each of one or more target cells, respectively. In some implementations, the one or more mobility execution condition may be configured for each of the one or more target cells, respectively.

Furthermore, the method in perspective of the wireless device described above in FIG. 12 may be performed by a software code 105 stored in the memory 104 included in the first wireless device 100 shown in FIG. 4.

More specifically, at least one computer readable medium (CRM) stores instructions that, based on being executed by at least one processor, perform operations comprising performing initial access towards a source cell, obtaining a mobility command including one or more mobility execution conditions and one or more target cell configurations, evaluating a mobility execution condition from the one or more mobility execution conditions only for cells for which corresponding target cell configuration from the one or more target cell configurations can be complied, and accessing a cell satisfying the mobility execution condition by using a corresponding target cell configuration for the cell.

Figure 13:
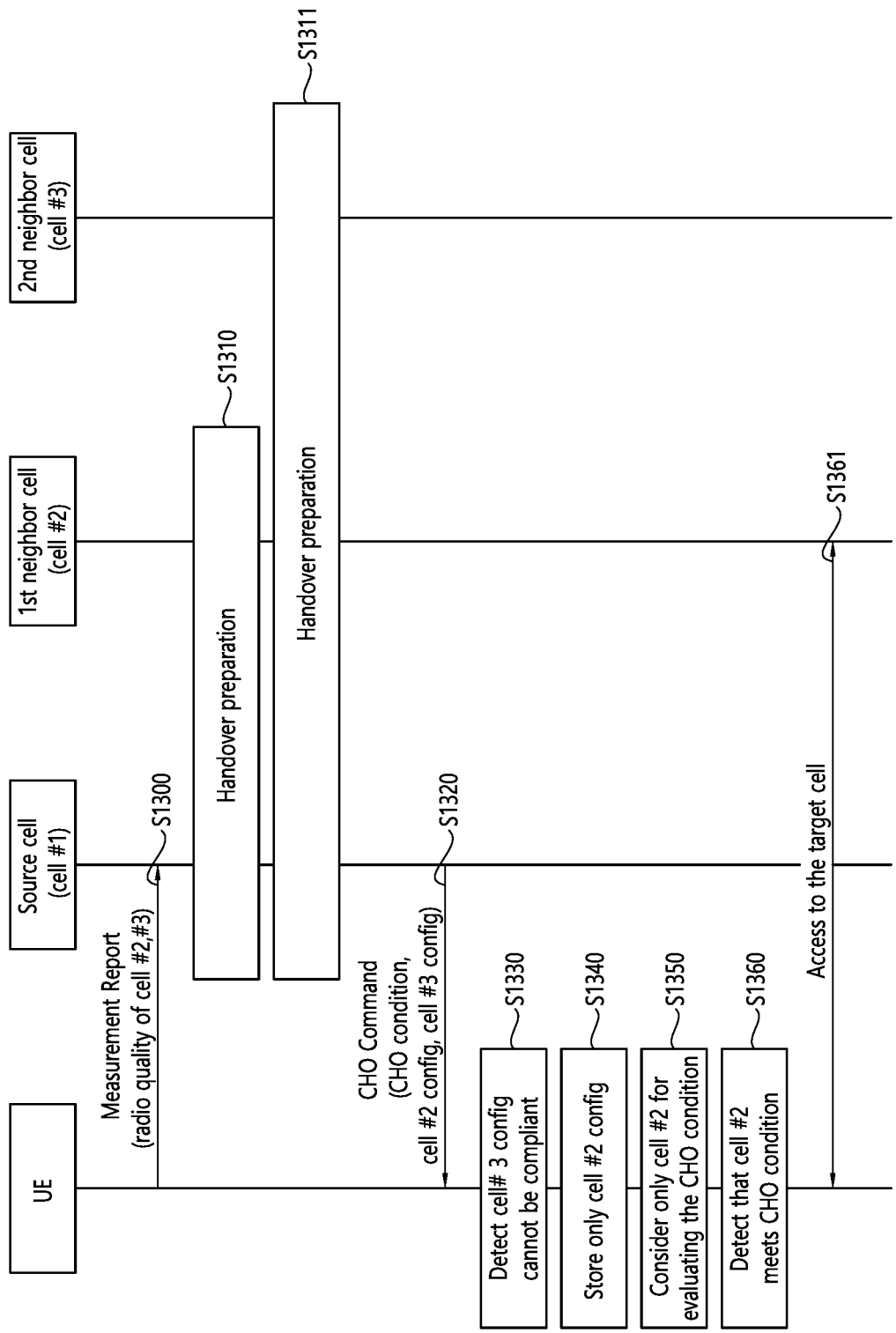
FIG. 13 shows an example of a CHO procedure to which implementations of the present disclosure is applied.

FIG. 13 shows an example of a CHO procedure to which implementations of the present disclosure is applied.

In FIG. 13, cell #1 is a source cell to which the UE performs initial access. Cell #2 is a first neighbor cell, and cell #3 is a second neighbor cell.

In step S1300, the UE sends a measurement report to its source cell (i.e., cell #1). The measurement report includes the radio quality of cell #2 and cell #3. The measurement report may possibly include the radio quality of cell #1.

In step S1310 and step S1311, upon receiving the measurement report, cell #1 initiates a handover preparation towards cell #2 and cell #3, respectively. Cell #2 sends to cell #1 a configuration that may be used as a target cell configuration for cell #2. Similarly, cell #3 sends a target cell configuration to cell #1.

In step S1320, cell #1 constructs a mobility command (e.g., CHO command) including one or more mobility execution conditions (e.g., CHO execution condition), target cell configuration for cell #2 and target cell configuration for cell #3. The UE receives the mobility command from cell #1.

In step S1330, the UE evaluates if each target cell configuration can be compliant, and the UE detects that target cell configuration for cell #3 cannot be compliant.

In step S1340, the UE stores only the target cell configuration for cell #2 and does not store the target cell configuration for cell #3. That is, the UE ignores the target cell configuration for cell #3. Since UE still has one valid target cell configuration, i.e., target cell configuration for cell #2, the UE does not initiate a connection recovery procedure, e.g., RRC (connection) re-establishment procedure.

In step S1350, the UE evaluates the mobility execution condition. For evaluation of the mobility execution condition, the UE excludes, from the mobility candidates, the cell #3. That is, the UE consider only cell #2 for candidates of evaluating the mobility execution condition.

In step S1360, the UE detects that the mobility execution condition is met for cell #2. Therefore, in step S1361, the UE applies the target cell configuration for cell #2 and initiates access to the cell #2.

Figure 14:
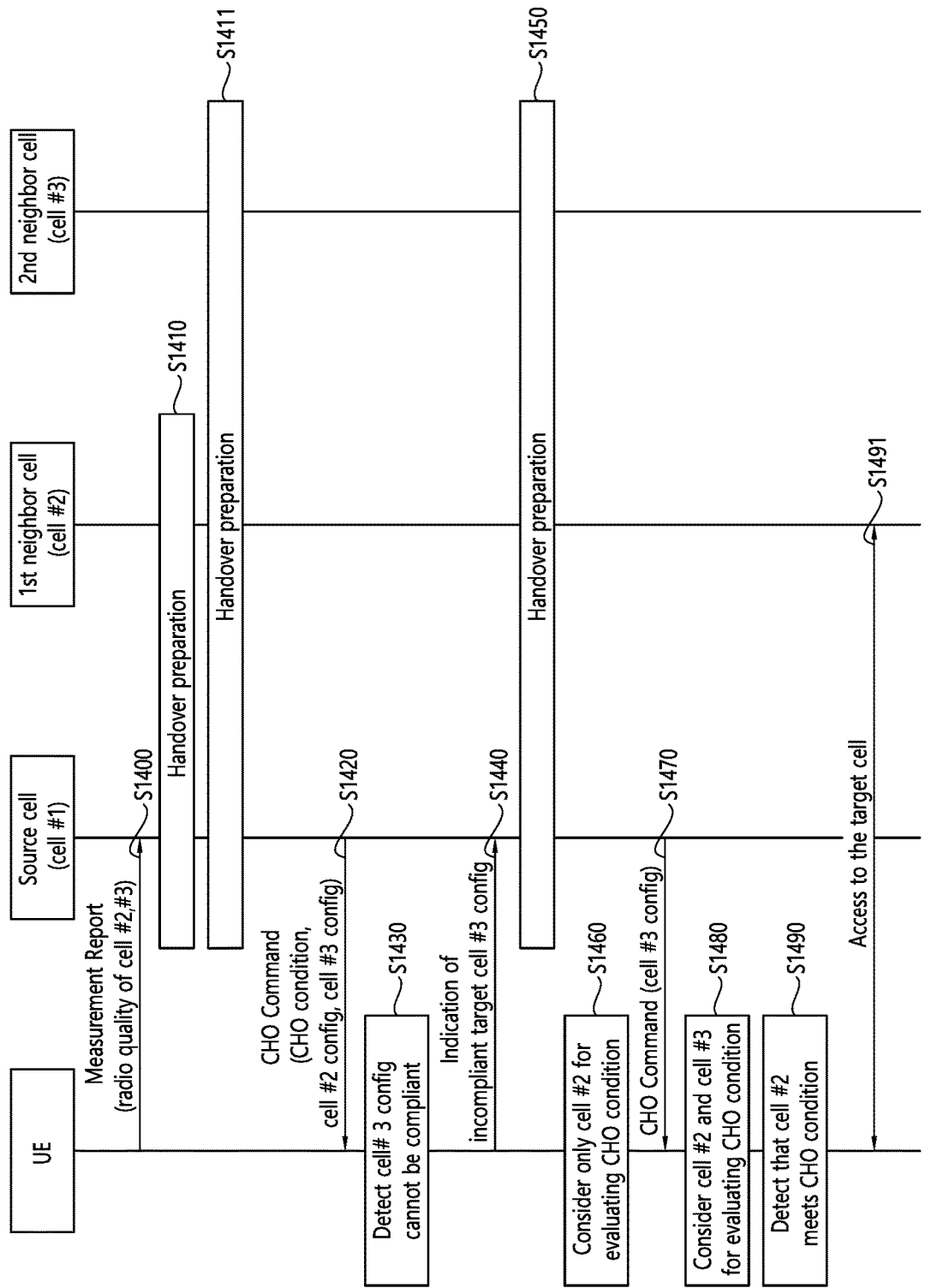
FIG. 14 shows another example of a CHO procedure to which implementations of the present disclosure is applied.

FIG. 14 shows another example of a CHO procedure to which implementations of the present disclosure is applied.

In FIG. 14, cell #1 is a source cell to which the UE performs initial access. Cell #2 is a first neighbor cell, and cell #3 is a second neighbor cell.

In step S1400, the UE sends a measurement report to its source cell (i.e., cell #1). The measurement report includes the radio quality of cell #2 and cell #3. The measurement report may possibly include the radio quality of cell #1.

In step S1410 and step S1411, upon receiving the measurement report, cell #1 initiates a handover preparation towards cell #2 and cell #3, respectively. Cell #2 sends to cell #1 a configuration that may be used as a target cell configuration for cell #2. Similarly, cell #3 sends a target cell configuration to cell #1.

In step S1420, cell #1 constructs a mobility command (e.g., CHO command) including one or more mobility execution conditions (e.g., CHO execution condition), target cell configuration for cell #2 and target cell configuration for cell #3. The UE receives the mobility command from cell #1.

In step S1430, the UE evaluates if each target cell configuration can be compliant, and the UE detects that target cell configuration for cell #3 cannot be compliant.

In step S1440, the UE indicates to cell #1 that the target cell configuration for cell #3 cannot be compliant.

In step S1450, upon receiving the indication from the UE, cell #1 requests to cell #3 a new target cell configuration and receives a new/updated target cell configuration.

In step S1460, the UE stores only the target cell configuration for cell #2 and does not store the target cell configuration for cell #3. That is, the UE ignores the target cell configuration for cell #3. Since UE still has one valid target cell configuration, i.e., target cell configuration for cell #2, the UE does not initiate a connection recovery procedure, e.g., RRC (connection) re-establishment procedure.

In step S1470, cell #1 sends the new/updated target cell configuration for cell #3 to the UE.

In step S1480, the UE evaluates if the new/updated target cell configuration for cell #3 can be compliant, and the UE detects that the new/updated target cell configuration for cell #3 can be compliant. Therefore, the UE considers both cell #2 and cell #3 for candidates of evaluating the mobility execution condition.

In step S1490, the UE detects that the mobility execution condition is met for cell #2. Therefore, in step S1491, the UE applies the target cell configuration for cell #2 and initiates access to the cell #2.

In the description above, CHO has been exemplary mentioned as a conditional mobility for the sake of convenience. The present disclosure can be further applied other forms of conditional mobility, such as conditional SCell change, without loss of generality.

The present disclosure can have various advantageous effects.

For example, according to implementations of the present disclosure, the rate of mobility failure can be reduced when the mobility command includes more than one target cell configurations.

For example, according to implementations of the present disclosure, unnecessary connection recovery procedure, e.g., RRC connection re-establishment procedure, can be avoided when the mobility command includes more than one target cell configurations.

For example, according to implementations of the present disclosure, when a target cell configuration cannot be compliant by the UE, a new/updated target cell configuration can be provided to the UE efficiently.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device configured to operate in a wireless communication system, the method comprising:
performing initial access with a source cell;
establishing a connection with a network node serving the source cell;
performing an access stratum (AS) security activation upon receiving a security command from the network node serving the source cell;
configuring radio bearers and a radio configuration upon receiving a radio resource control (RRC) reconfiguration message from the network node serving the source cell;

receiving, from the network node serving the source cell, a mobility command including one or more mobility execution conditions and one or more target cell configurations, wherein the one or more target cell configurations are configured for each of one or more target cells, respectively;

based on not being able to comply with at least one target cell configuration from the one or more target cell configurations:
i) transmitting, to the network node serving the source cell, information informing the network node that the wireless device has at least one target cell configuration which cannot be complied with;
ii) receiving, from the network node serving the source cell, an indication of releasing the at least one target cell configuration which cannot be complied with; and
iii) evaluating a mobility execution condition from the one or more mobility execution conditions only for cells for which a corresponding target cell configuration from the one or more target cell configurations can be complied with; and accessing a cell satisfying the mobility execution condition by using based on a corresponding target cell configuration for the cell.

2. The method of claim 1, further comprising:
storing the one or more target cell configurations except the at least one target cell configuration which cannot be complied with.

3. The method of claim 1, wherein the information further informs the network node of the at least one target cell for which the corresponding target cell configuration cannot be complied with.

4. The method of claim 1, further comprising:
receiving, from the network node serving the source cell, an updated configuration for the at least one target cell configuration which cannot be complied with.

5. The method of claim 1, further comprising:
performing a connection re-establishment procedure based on the wireless device not being able to comply with any of the one or more target cell configurations.

6. The method of claim 1, wherein the one or more mobility execution conditions are configured for each of the one or more target cells, respectively.

7. The method of claim 1, wherein the wireless device is in communication with at least one of a mobile device, a network, and/or autonomous vehicles other than the wireless device.

8. A wireless device configured to operate in a wireless communication system, the wireless device comprising:
at least one transceiver;
at least one processor; and
at least one computer memory operably connectable to the at least one processor and storing instructions that, based on being executed by the at least one processor, perform operations comprising:
performing initial access with a source cell;
establishing a connection with a network node serving the source cell;
performing an access stratum (AS) security activation upon receiving a security command from the network node serving the source cell;
configuring radio bearers and a radio configuration upon receiving a radio resource control (RRC) reconfiguration message from the network node serving the source cell;
receiving, from the network node serving the source cell via the at least one transceiver, a mobility command including one or more mobility execution conditions and one or more target cell configurations, wherein the one or more target cell configurations are configured for each of one or more target cells, respectively;

based on not being able to comply with at least one target cell configuration from the one or more target cell configurations:
i) transmitting, to the network node serving the source cell via the at least one transceiver, information informing the network node that the wireless device has at least one target cell configuration which cannot be complied with;
ii) receiving, from the network node serving the source cell via the at least one transceiver, an indication of releasing the at least one target cell configuration which cannot be complied with; and
iii) evaluating a mobility execution condition from the one or more mobility execution conditions only for cells for which a corresponding target cell configuration from the one or more target cell configurations can be complied with; and accessing a cell satisfying the mobility execution condition based on a corresponding target cell configuration for the cell.

9. The wireless device of claim 8, wherein the operations further comprise:
storing the one or more target cell configurations except the at least one target cell configuration which cannot be complied with.

10. The wireless device of claim 8, wherein the information further informs the network node of the at least one target cell for which the corresponding target cell configuration cannot be complied with.

11. The wireless device of claim 8, wherein the operations further comprise:
receiving, from the network node serving the source cell, an updated configuration for the at least one target cell configuration which cannot be complied with.

12. The wireless device of claim 8, wherein the one or more mobility execution conditions are configured for each of the one or more target cells, respectively.

13. A processing apparatus for configured to control a wireless device in a wireless communication system, the processing apparatus comprising:
at least one processor; and
at least one computer memory operably connectable to the at least one processor,
wherein the at least one processor is configured to perform operations comprising:
performing initial access with a source cell;
establishing a connection with a network node serving the source cell;
performing an access stratum (AS) security activation upon receiving a security command from the network node serving the source cell;
configuring radio bearers and a radio configuration upon receiving a radio resource control (RRC) reconfiguration message from the network node serving the source cell;
obtaining a mobility command including one or more mobility execution conditions and one or more target cell configurations, wherein the one or more target cell configurations are configured for each of one or more target cells, respectively;
based on not being able to comply with at least one target cell configuration from the one or more target cell configurations:

i) generating information informing the network node that the wireless device has at least one target cell configuration which cannot be complied with;
ii) obtaining an indication of releasing the at least one target cell configuration which cannot be complied with; and
iii) evaluating a mobility execution condition from the one or more mobility execution conditions only for cells for which a corresponding target cell configuration from the one or more target cell configurations can be complied with; and accessing a cell satisfying the mobility execution condition based on a corresponding target cell configuration for the cell.

* * * * *